United States Patent [19]

Molock et al.

[11] Patent Number: 5,681,871
[45] Date of Patent: Oct. 28, 1997

[54] METHOD FOR PREPARING ULTRAVIOLET RADIATION ABSORBING CONTACT LENSES

[75] Inventors: Frank F. Molock, Orange Park; Ivan M. Nunez, Jacksonville; James D. Ford, Orange Park, all of Fla.

[73] Assignee: Johnson & Johnson Vision Products, Inc., Jacksonville, Fla.

[21] Appl. No.: 449,004

[22] Filed: May 24, 1995

[51] Int. Cl.$^6$ .................. C08L 33/04; C08K 5/09
[52] U.S. Cl. .............. 523/106; 264/1.1; 264/1.38; 264/2.6; 351/160 H; 351/177; 526/320; 526/323.2; 526/329.6; 524/294
[58] Field of Search .................. 351/160, 177; 523/106; 524/294; 526/320, 323.2, 329.6; 264/1.1, 1.38, 2.6

[56] References Cited

U.S. PATENT DOCUMENTS

| | | | |
|---|---|---|---|
| Re. 27,401 | 6/1972 | Wichterle et al. | 264/49 |
| Re. 33,477 | 12/1990 | Loshaeck | 264/1.1 |
| 2,976,576 | 3/1961 | Wichterle et al. | 264/49 |
| 4,304,895 | 12/1981 | Loshaek | 523/106 |
| 4,390,676 | 6/1983 | Loshaek | 523/106 |
| 4,426,492 | 1/1984 | Steckler | 523/106 |
| 4,486,577 | 12/1984 | Mueller et al. | 528/28 |
| 4,495,313 | 1/1985 | Larsen | 523/106 |
| 4,565,348 | 1/1986 | Larsen | 523/106 |
| 4,680,336 | 7/1987 | Larsen et al. | 523/106 |
| 4,803,254 | 2/1989 | Dunks et al. | 523/106 |
| 4,891,046 | 1/1990 | Wittman et al. | 523/106 |
| 5,098,445 | 3/1992 | Hung et al. | 8/507 |
| 5,147,396 | 9/1992 | Kageyama et al. | 8/507 |
| 5,292,350 | 3/1994 | Molock et al. | 8/507 |
| 5,399,692 | 3/1995 | Hung et al. | 8/507 |
| 5,480,927 | 1/1996 | Janssen et al. | 523/106 |

FOREIGN PATENT DOCUMENTS 0 642 039  3/1995  European Pat. Off. .

OTHER PUBLICATIONS

Henkel Corporation, Coatings & Inks Division; "Photonol PHO–7025" *Product Bulletin*; 1990.

*Primary Examiner*—Andrew E. C. Merriam

[57] ABSTRACT

Disclosed is a process for producing an ultraviolet radiation absorbing contact lens from a lens shaped polymer having hydroxyl groups pendant therefrom and having dispersed therein a UV absorbing agent substituted with at least one anhydride group which is exposed to basic conditions such that the hydroxyl groups react with the anhydride groups on the UV absorbing agent. As a result the UV absorbing agent becomes fixed to the polymer through the formation of a covalent ester bond.

14 Claims, 1 Drawing Sheet

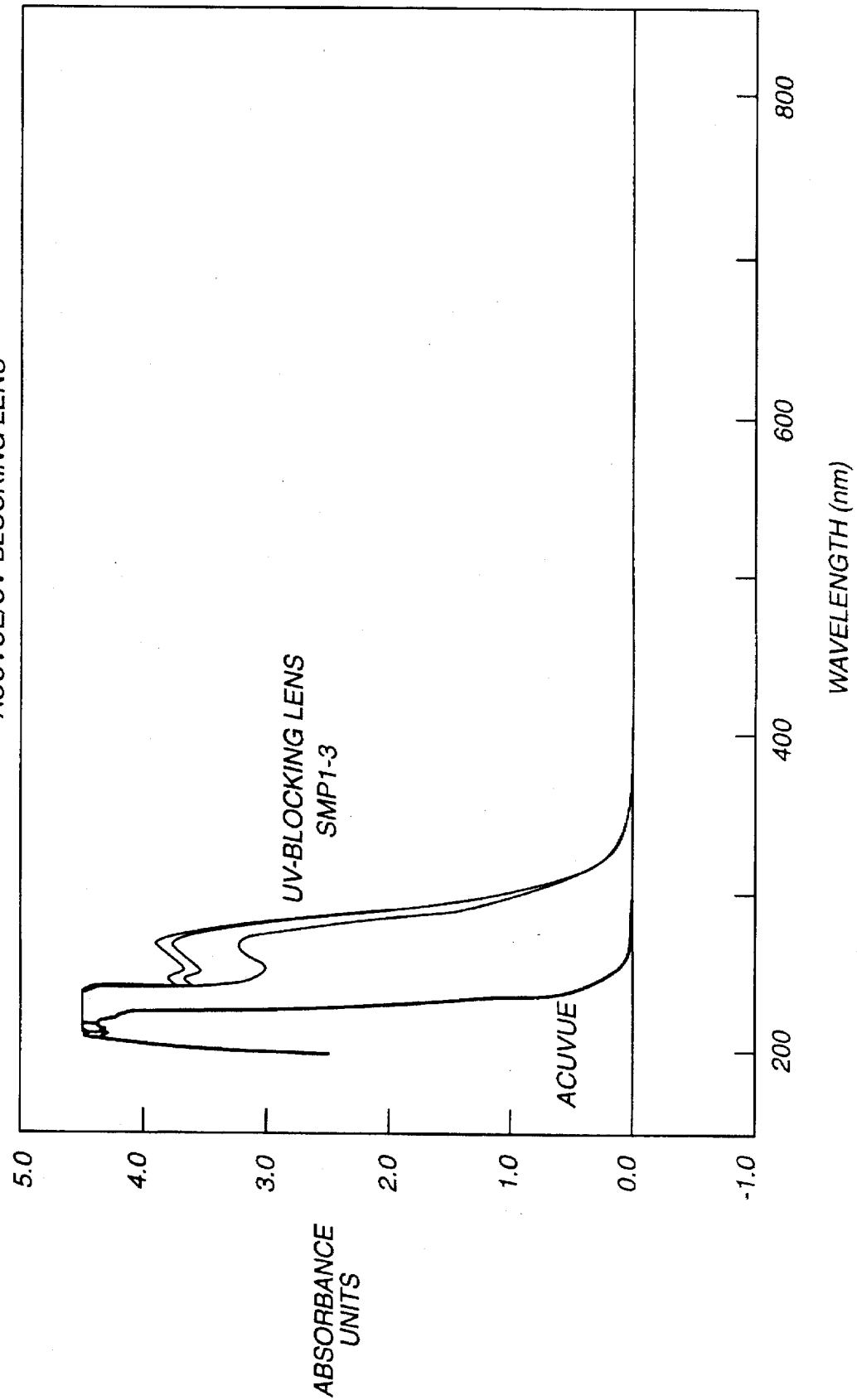

METHOD FOR PREPARING ULTRAVIOLET RADIATION ABSORBING CONTACT LENSES

BACKGROUND OF THE INVENTION

The present invention relates to a process for producing ultraviolet radiation absorbing contact lenses. More particularly, the invention relates to a process for producing hydrophilic contact lenses having a UV radiation absorbing agent covalently bonded to polymeric material.

Exposure to ultraviolet radiation, 200–400 nm, is known to be damaging to the cornea and to be the cause of several ocular pathologies. For this reason it is important to provide adequate ocular protection against ultraviolet radiation. Such protection is particularly recommended for people who are prone to UV exposure, patients who have had cataract surgery and patients on photosensitizing drugs.

Recently, contact lenses have been developed which serve to absorb UV radiation. For example, U.S. Pat. No. 4,390,676 discloses a UV absorbing contact lens formed by copolymerizing a monomer suitable for making lenses and an ultraviolet absorber. The copolymerization efficiency of the compounds has proved to be inadequate, requiring the extraction of the UV absorbing compound prior to using the lens. The extraction process may take from 3 to 20 days.

U.S. Pat. No. 5,098,445 discloses a UV absorbing contact lens which has a reactive UV absorbing agent covalently bound to the polymeric material. The UV absorbing agent is applied to the lens by dipping the lens into an aqueous medium having dissolved therein a halotriazine which is substituted with a UV-absorbing moiety. However, the triazinyl molecule that is thereby incorporated into the lens polymer can be expected to deleteriously affect the desirable physical and/or refractive properties of the lens. Also, relying on the halotriazine to react with the lens polymer introduces uncertainty as to the degree of reaction that occurs, and limits the scope of lens materials into which UV absorbers can be incorporated by the disclosed techniques. Indeed, this patent teaches that crosslinking a lens polymer generally renders this technique ineffective, yet as is well known many contact lenses, especially hydrophilic lenses, must be made of crosslinked polymeric material.

There exists, therefore, a need for an improved method for producing a UV absorbing contact lens.

There also exists a need for a method to produce a UV absorbing contact lens which can be prepared in a relatively short amount of time.

There further exists a need for a method to produce a contact lens from which the absorbing agent has a reduced tendency to leach out after preparation.

There exists a more particular need for a method to produce a lens via in situ polymerization in which the absorbing agent does not interfere with the polymerization reaction.

SUMMARY OF THE INVENTION

The present invention relates to a process for producing an ultraviolet radiation absorbing contact lens which has a UV absorbing agent covalently bonded to the polymeric material. In the present invention, a lens shaped polymer having hydroxyl groups pendant therefrom and having dispersed therein a UV absorbing agent substituted with at least one anhydride group is exposed to basic conditions such that the hydroxyl groups react with the anhydride groups on the UV absorbing agent. As a result the UV absorbing agent becomes fixed to the polymer through the formation of a covalent ester bond. Because of the covalent bonding, the absorbing agent does not leach out after preparation of the lens. It is critical in the present invention that the UV absorbing agent at the level of inclusion does not interfere with the UV initiated polymerization of the monomers used in preparing the lens.

BRIEF DESCRIPTION OF THE DRAWING

FIG. 1 is a plot of absorbance versus wavelength for a contact lens prepared in accordance with the present invention compared with a conventional contact lens.

DETAILED DESCRIPTION OF THE INVENTION

While the present invention is applicable to intraocular lenses and lenses used in spectacles, it will be described in connection with contact lenses, both corrective and noncorrective. The present invention relates to a process for producing ultraviolet radiation absorbing lenses comprising a UV absorbing agent covalently bonded to polymeric lens material.

The UV absorbing agent is a UV absorbing compound substituted with at least one anhydride group. It is through the anhydride group that the UV absorbing agent is capable of covalently bonding to the pendant hydroxyl groups of the polymer. The UV absorbing compound is chosen from the group of compounds that absorb radiation having wavelengths within all or part of the range of 200–450 nm and have functionality allowing bonding to an anhydride group.

Possible UV absorbing compounds include oxalic acid diamides, hydroxyphenyltriazines, benzotriazoles, benzophenones, benzoic acid esters and cyano and carbomethoxy acrylates.

Examples of oxalic acid diamides include, 4,4'dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy-disubstituted oxanilides and mixtures of o- and p-ethoxy-disubstituted oxanilides.

Examples of hydroxyphenyltriazines include the 2-(2-hydroxyphenyl)-1,3,5-triazines such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl-1,3,5-triazine.

Examples of benzotriazoles include the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis($\alpha,\alpha$-dimethylbenzyl) derivatives of 2-(2'-hydroxyphenyl)-benzotriazole.

Examples of benzophenones include the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives of 2-hydroxybenzophenone.

Examples of esters of substituted and unsubstituted benzoic acids include 4-tert-butylphenyl salicylate, phenyl salicylate, octylphenyl salicylate, dibenzoylrescorinol, bis (4-tert-butylbenzoyl)-resorcinol, benzoylrescorinol, 2,4-di-tert-butylphenyl 3,5-di-tert-butyl-4-hydroxybenzoate and hexadecyl 3,5-di-tert-butyl-4-hydroxybenzoate.

Examples of acrylates include ethyl α-cyano-β-β-diphenylacrylate, isooctyl α-cyano-β-β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxycinnamate and N-(β-carbomethoxy-β-cyanovinyl)-2-methylindoline.

These UV absorbing compounds are commercially available or can be synthesized by conventional techniques familiar to one of ordinary skill in the art.

The UV absorbing agent used in the process of the present invention is a UV absorbing compound substituted with at least one anhydride group. The preferred UV absorbing agent is benzophenonetetracarboxylic dianhydride.

The UV absorbing agent is prepared by derivatizing the UV absorbing compounds described herein so as to add the anhydride group(s). This synthesis can be carried out using techniques familiar in the art. Common synthesis techniques include using thionyl chloride to activate a carboxylic acid by forming the corresponding acryloyl chloride which further reacts with free carboxylic acid; activation of carboxylic acid with phosphorous acid halides, e.g. $(PhO)_2POCl$; use of carbodiimides to effect dehydration of carboxylic acid to anhydrides; and the use of dehydrating agents such as trimethylsilylethoxy acetylene ($Me_3Si$—C≡C—OEt). A well known method to provide unsymmetrical anhydrides involves reacting metal salts of carboxylic acids with acid halides.

The amount of UV absorbing agent added is determined empirically since each agent absorbs differently and since each would have a different level at which it could be incorporated into the lens before it would interfere with the polymerization. Where the UV absorbing agent is incorporated into the mixture of monomers which are thereafter polymerized to form the lens, it is critical that the UV absorbing agent at the level of inclusion not interfere with the UV initiated polymerization of the monomers used to make the contact lens; in such embodiments of the invention, an amount sufficient to increase the UV absorbance capability without interfering with polymerization is chosen.

In general, satisfactory amounts of the UV absorbing agent-anhydride derivative to use when it is added to the mixture of monomers are on the order of 0.5 to 4.0% and satisfactory amounts when it is soaked into the lens after the polymerization are on the order of 0.5 to 5.0%. These ranges will vary depending upon such things as the reactive efficiency of the UV absorbing agent-anhydride derivative, the final hydrated lens thickness and the dispersion of the UV absorbing agent into the lens.

The compounds which form the polymeric lens material may vary so long as there is present in the monomer mixture a component which upon polymerization will provide the polymer with the required pendant hydroxyl groups. Examples of such monomers include, but are not limited to, hydroxyalkyl esters, hydroxy alkoxyalkyl, hydroxy (polyalkoxy), and poly(alkoxy) esters of polymerizable unsaturated acids, such as acrylic acid, methacrylic acid, fumaric, maleic, etc. Other suitable monomers include unsaturated acids per se, such as acrylic, methacrylic, fumaric, maleic, etc.; heterocyclic N-vinyl lactams, such as N-vinyl pyrrolidone, etc.; noncyclic amides such as N-(1,1-dimethyl-3-oxobutyl)acrylamide; amino alkyl esters of unsaturated acids such as 2-aminoethylacrylate, methacrylate, fumarate, or maleate; mercapto alkyl esters of unsaturated acids such as 2-mercapto ethyl acrylate, methacrylate, fumarate or maleate. Other suitable monomers, particularly wherein each alkyl group contains 1–3 carbon atoms will be apparent to one of ordinary skill in the art.

It is preferable to use hydrophilic monomers, that is monomers in appropriate amounts, so that the polymerized product is hydrophilic. A hydrophilic polymer is a polymer capable of forming a hydrogel when contacted with water. It is more preferable for this reason to use hydroxy-substituted hydrophilic monomers.

The most preferred hydrophilic monomers are esters of acrylic or methacrylic acid with alkyl groups (especially containing 1 to 6 carbon atoms) that are substituted with 1,2 or more hydroxyl groups. Examples of such hydroxy esters include, but are not limited to, hydroxyethylmethacrylate, (HEMA), hydroxyethylacrylate, (HEA), 2,3-dihydroxypropyl methacrylate (glycerylmethacrylate), hydroxypropylmethacrylate and hydroxypropylacrylate. The most preferred hydroxy ester is HEMA, which is the monomer most commonly used in the preparation of "soft" hydrogel contact lenses. HEMA is disclosed in U.S. Pat. No. 2,976,576 and U.S. Pat. No. Re. 27,401. An acceptable "hard" lens material is cellulose acetate butyrate. Other suitable monomers containing reactive hydrogen, such as OH or NH groups, will be apparent to those of ordinary skill in the art.

The hydrophilic monomer is preferably copolymerized in a reaction mixture with hydrophilic or hydrophobic comonomers such as methacrylic acid (MAA). In addition, polyfunctional monomers, used as crosslinking agents, such as ethylene glycol dimethacrylate (EGDMA) and trimethylolpropane trimethacrylate (TMPTMA) can be used to improve the dimensional stability and other physical properties of the lens. Additional comonomers and crosslinking comonomers include acrylate and methacrylate diesters of polyethyleneglycol (PEG) wherein the molecular weight of the PEG segment is 100 to 8,000, acrylate and methacrylate diesters of bisphenol A (BPA) diols ethoxylated at one or at each of the diol ends with 1–20 ethoxy units, $C_1$–$C_6$ aliphatic alcohol acrylates and methacrylates, perfluoro alcohol $C_1$–$C_6$ methacrylates and perfluoro $C_1$–$C_6$ alcohol acrylates. By "acrylate and methacrylate diesters" is meant diacrylates, dimethacrylates, and diesters carrying one acrylate moiety and one methacrylate moiety. Examples include PEG 4500, BPA (ethoxylated with a total of 10 moles of ethylene oxide (EO)), PEG 350 monomethylether or dodecanol, that has been reacted with one or more molar equivalents of an end-capping group such as isocyanatoethyl methacrylate (IEM), methacrylic anhydride or methacrylyl chloride to produce compounds with one or more terminal methacrylate groups bonded through linking moieties such as carbamate or ester groups. Other comonomers and crosslinking comonomers are well known to one of ordinary skill.

The monomer reaction mixture also includes an initiator, usually from about 0.05 to 5.0 percent of a free radical initiator which is thermally activated. Typical examples include lauroyl peroxide, benzoyl peroxide, isopropyl percarbonate, azobisisobutyronitrile and known redox systems such as the ammonium persulfate sodium metabisulfite combination and the like. Irradiation by ultraviolet light, electron beam, or a radioactive source may also be employed to initiate the polymerization reaction, optionally with the addition of a polymerization initiator, e.g. benzoin and its ethers. It is preferred to use α-hydroxy-α, α-dimethylacetophenone (Darocur 1173) which is a UV reactive initiator. Other initiator compounds would be familiar to one of ordinary skill.

The polymerization reaction is known to those of ordinary skill in the art and is carried under conditions that can be readily established for any particular set of reactants. The polymerization can be carried out in the presence or absence of an inert diluent. If the polymerization is carried out in the absence of a diluent the resulting polymeric composition can be formed, as for example by lathe cutting, into the desired lens shape. Alternatively, and more preferably, the polymerization is carried out in the presence of a suitable inert diluent, for example, the diluents described in U.S. Pat. No. 4,680,336 which is incorporated by reference herein. The polymerization may also be carried out in the presence of a suitable water displaceable inert diluent, for example the diluents such as methanol, ethanol, acetone, and glycol, described in EPO Application No. 94305394.2 which is incorporated herein by reference. The preferred inert diluent is a water displaceable boric acid ester. The characteristics of desired boric acid esters as well as the preferred concentration of ester in the polymerization reaction mixture is described in detail in U.S. Pat. No. 4,495,313 which is incorporated by reference herein. For instance, suitable boric acid esters include those prepared by heating boric acid and one or more polyhydroxyl compounds with three or more hydroxyl groups. Suitable polyhydroxyl groups include glycerol, trimethylolpropane, glucose, and mixtures of any of these with compounds having two hydroxyl groups such as propylene glycol, diethylene glycol, butane diol, and/or sorbitol.

The preferred methods for forming the desired lens when a diluent is used include centrifugal casting and cast molding, for example using molds described in U.S. Pat. No. 4,565,348, as well as combinations of these methods with the other methods described generally herein.

The UV absorbing agent (i.e. one or more UV absorbing compounds substituted with at least one anhydride group) must be dispersed throughout the polymer prior to covalently bonding the agent to the polymer backbone. This may occur one of two ways. One way is to add the UV absorbing agent to the mixture of monomers and other materials used to form the lens. The reaction mixture undergoes polymerization under conditions such that the UV absorbing agent does not react. The resulting polymer contains the UV absorbing agent dispersed throughout.

The second way to disperse the agent throughout the polymer is to soak the already formed polymer in a solution, preferably an aqueous solution, containing the UV absorbing agent. The solvent, if not water, should be capable of carrying the UV absorber anhydride into and throughout the lens polymer, without reacting with the anhydride group or group(s), the UV absorbing compound, nor with the polymer. Other solvents include methanol, ethanol and isopropyl alcohol. By this method, a preformed contact lens is placed in a solution containing a UV absorbing agent.

The polymer, with the UV absorbing agent dispersed throughout, is then treated to cause it to undergo base hydration to covalently bond the agent to the polymer through the hydroxyl groups pendant from the polymer. This can be done using the conventional technique of contacting the lens with an aqueous solution of a base such as sodium hydroxide or potassium hydroxide prior to hydration as disclosed, for example, in U.S. Pat. No. 4,891,046 which is incorporated herein by reference. The preferred base is an alkali or alkaline earth metal carbonate, or phosphate, and the required contact time will depend on the contact temperature and the components of the hydrophilic polymer composition.

When bonding of the UV absorbing agent to the polymer is complete, the lens can be hydrated to its equilibrium water content. Generally the water content of the lens will vary from about 0 to about 85 weight percent, preferably 30 to 60 weight percent.

The following examples are intended to illustrate the claimed invention and are not in any way designed to limit its scope. Numerous additional embodiments within the scope and spirit of the claimed invention will become apparent to those skilled in the art.

The components used in the preparation of the contact lenses of the examples are abbreviated as follows: 2-hydroxyethyl methacrylate (HEMA), methacrylic acid (MAA), ethyleneglycol dimethacrylate (EGDMA), trimethylolpropane trimethacrylate (TMPTMA), glycerine boric acid ester (BAE) and α-hydroxy-α, α-dimethylacetophenone (Darocur 1173), which is a UV reactive initiator. The monomers used in all of the examples are highly purified monomers with less than 0.1% impurities. Photonol 7025 is a polyether diol used as an inert, water displaceable diluent and available from the Henkel Corporation in Ambler, Pa.

EXAMPLE 1

Synthesis of Glycerin Boric Acid Ester (BAE)

A total of 61.83 g (1.0 mols) of boric acid was placed into a 3 L rotary evaporator flask. To this flask was added 322.32 g glycerin (3.5 mols). The flask was then placed on a rotary evaporator and the pressure was slowly reduced to 0.5–1.0 mm Hg. After full vacuum was established, the temperature of the bath was slowly raised to 85° C. at approximately 5° C. per 20 minutes. Water was recovered from the reaction as the boric acid ester was formed. The clear viscous liquid BAE was used as is.

EXAMPLE 2

Preparation of the Monomer Reaction Mixture with BAE

A blend was prepared using 96.81% by weight of HEMA, 1.97% MAA, 0.78% EGDMA, 0.1% TMPTMA an 0.34% of DAROCUR 1173. To 48% by weight of this monomer mix was added 52% of BAE as an inert, water displaceable diluent. After thoroughly mixing the resulting formulation (hereinafter the "reactive monomer mixture" or the "RMM") at ambient conditions, the mixture was allowed to stir under reduced pressure (40 mm Hg) for 30 min (at 25° C.) and subsequently transferred to contact lens molds. The filled molds were exposed to UV light (wavelength=300–380 nm, dose=1.2–1.6 Joules/cm$^2$) for 20 minutes at approximately 50° C. The molds were then separated, and placed in physiological saline for 3.0 hrs at 70° C. to remove the inert diluent and any residual, unreacted monomers. The lenses were then rinsed in fresh physiological saline at 40° C. After this initial hydration period the lenses were allowed to equilibrate in a fresh bath of physiological saline at 35° C. for 3 hours.

EXAMPLES 3–8

Solubility of UV Absorbing Agent

To separate samples of the reactive monomer mix (RMM) prepared in accordance with Example 2, were added 0.05, 0.10, 0.25, 0.60, 0.80, and 1.0% of 3,3',4,4'-benzophenonetetracarboxylic dianhydride. After thoroughly mixing each sample at ambient conditions the mixtures were allowed to stir under reduced pressure (40 mm Hg) for 30 min. at 25° C.

The samples were then used to determine the solubility of the UV absorbing anhydride agent in the polymer and the effect of the UV absorbing anhydride agent on the polymerization reaction as monitored by DSC i.e., TTP and Enthaply.

EXAMPLE 9

Preparation of the Monomer Reaction Mixture with Photonol 7025 as an Inert, Water Displaceable Diluent A blend was prepared using 96.81% by weight of HEMA, 1.97% MAA, 0.78% EGDMA, 0.1% TMPTMA and 0.34% of DAROCUR 1173. To 48% by weight of this monomer mix was added 52% of Photonol 7025. After thoroughly mixing the resulting formulation (hereinafter the "reactive monomer mixture" or the "RMM") at ambient conditions the mixture was allowed to stir under reduced pressure (40 mm Hg) for 30 min. at 25° C.

EXAMPLE 10

To a sample, 99.0%, of the reactive monomer mix (RMM) of Example 9 was added 1.0% of 3,3',4,4'-benzophenonetetracarboxylic dianhydride. After thoroughly mixing the above sample at ambient conditions the mixture was allowed to stir under reduced pressure (40 mm Hg) for 30 min. at 25° C.

This sample was then used to determine the solubility of the UV absorbing anhydride agent in the polymer and the effect of the UV absorbing anhydride agent on the polymerization reaction as monitored by DSC i.e., TTP and Enthaply.

EXAMPLE 11

Preparation of Contact Lenses with UV Absorbing Agent

To a sample, 99.2%, of the reactive monomer mix (RMM) of Example 9 was added 0.8% of 3,3',4,4'-benzophenonetetracarboxylic dianhydride. After thoroughly mixing the above sample at ambient conditions the mixture was allowed to stir under reduced pressure (40 mm Hg) for 30 min (at 25° C.) and subsequently transferred to contact lens molds. The filled molds were exposed to UV light (wavelength=300–380 nm, dose=1.2–1.6 Joules/cm$^2$) for 20 minutes at approximately 50° C. The molds were then separated, and placed in physiological saline for 3.0 hrs at 70° C. to remove the inert diluent and any residual, unreacted monomers.

Then, the lenses were hydrated in a 2 wt. % aqueous solution of potassium carbonate at 50° C. for 60 minutes. After this initial hydration period the lenses were rinsed in fresh physiological saline at 50° C. for 15 minutes. The lenses were allowed to equilibrate in fresh physiological saline at 35° C. for 3 hours, whereupon they were ready for packaging.

The test methods for determining the physical properties set forth in Tables I, II and III are as follows:

DIFFERENTIAL SCANNING PHOTOCALORIMETER

A sample size of 5.0 milligrams was used. Nitrogen was purged at 40 mL/min and temperature of 45° C. isothermal.

Cure cycle began at 10 minutes at an intensity of 2.5 mW/cm$^2$ and continued for 10 minutes. "Acuvue 14.0" polymer cured under the same conditions was used as the reference material.

TABLE I

| I.D. | % RMM | % DIANHYDRIDE | TIME TO PEAK | ENTHALPY |
|---|---|---|---|---|
| Control | 100 | 0 | 1.16 min | 163.0 J/g |
| Example 3 | 99.95 | 0.05 | 1.35 | 186.7 |
| Example 4 | 99.90 | 0.10 | 1.47 | 181.7 |
| Example 5 | 99.75 | 0.25 | 1.58 | 193.4 |
| Example 6 | 99.40 | 0.60 | 1.77 | 192.0 |
| Example 7 | 99.20 | 0.80 | 1.85 | 183.3 |
| Example 8 | 99.00 | 1.00 | 1.88 | 165.3 |

TABLE II

| I.D. | % RMM | % DIANHYDRIDE | TIME TO PEAK | ENTHALPY |
|---|---|---|---|---|
| Control | 100 | 0 | 1.63 min | 217.1 J/g |
| Example 10 | 99.00 | 1.00 | 3.68 | 218.5 |

TABLE III

| I.D. | % RMM | % DIANHYDRIDE | TIME TO PEAK | ENTHALPY |
|---|---|---|---|---|
| Control | 100 | 0 | 1.18 min | 176.6 J/g |
| Example 11 | 99.20 | 0.80 | 2.65 | 175.7 |

The results shown in Table I (BAE as diluent) and Tables II and III (Photonol 7025 as diluent) indicate that the polymerization was not adversely interfered with by the inclusion of the UV absorbing species. It is critical that the UV absorbing material at the level of inclusion not interfere with the UV initiated polymerization of the monomers used to prepare the hydrogel. The Time to Peak (TTP) and Enthalpy (E) results were obtained using a Differential Scanning Photocalorimeter. The TTP is the point at which the maximum heat of reaction occurs and is the point after which the reaction rate slows.

UV-VIS SPECTROSCOPY

Three separate samples prepared according to Example 11 were analyzed using a Cary Model 2300 UV-Vis spectrometer with a 1 nm/sec scan speed, 1 nm resolution and scan range of 800–200 nm. A lens clamped into a lens holder with 6 mm aperture was inserted into a 10 mm quartz cuvette filled with physiological saline. Background correction was made with a quartz cuvette, lens holder and physiological saline with no lens. The control was "Acuvue" prepared in accordance with Example 2.

The results in FIG. 1 show the increased UV absorbing ability of the samples containing the UV absorbing agent as compared to a lens without.

The test methods for determining the physical properties set forth in Table IV are as follows:

TENSILE PROPERTIES (Modulus, Elongation and Strength)

A sample prepared in accordance with Example 11 was cut to the desired specimen size and shape, and the cross sectional area measured. The sample was then attached to the upper grip of a constant rate of crosshead movement type of testing instrument equipped with a load cell. The sample was elongated at a constant rate of strain and the resulting stress-strain curve recorded. The results are shown in Table IV; elongation is expressed in percent, and tensile modulus and strength in psi (lbs/in$^2$).

GRAVIMETRIC WATER CONTENT

The water content of a lens prepared in accordance with Example 11 was determined by first weighing a lens that had been equilibrated in saline, and subsequently drying the lens for two hours at 65° C. under reduced pressure (<5 mm Hg). The dried lens was weighed and the gravimetric water content calculated as follows:

$$\% \text{ water} = 100 \times (m_{wet} - m_{dry}) / m_{wet}$$

where $m_{wet}$ represents the wet lens mass (mass of polymer plus mass of saline) and $m_{dry}$ represents the dry polymer mass.

VISCOSITY

Viscosity was measured using a Brookfield Digital Viscometer Model DV-II, Brookfield Engineering Laboratories, Inc. A sample prepared according to Example 11 was equilibrated to ±0.5° C. in the viscometer fluid container using a Fisher Scientific refrigerating circulator (Model 9100 series) and monitored with an Omega microprocessor thermometer (Model HH23). The direct reading obtained from the viscometer was multiplied by the factor appropriate to the spindle and speed used and is expressed in centipoise. Blends using mPEG 2000 had spindle 18 and speed of 6 rpm; blends using PEG 4500 had spindle 18 and speed of 3 rpm.

Water Content

Water content was measured using a Coulomatic K-F Titrimeter Model 447, Fisher Scientific. A sample prepared in accordance with Example 11 was injected into the reaction vessel using a 1 cc syringe. Sample weight was 0.4–0.6 grams, with an extraction time of 20 seconds. The direct reading of water content was expressed in weight percent.

TABLE IV

| | Water % | Viscosity | Modulus | Elongation | EWC |
|---|---|---|---|---|---|
| Example 11 | 0.5603 | 2.5 cps | 35.1 psi | 116.7% | 65.9 |

We claim:

1. A process for producing a UV absorbing contact lens comprising the steps of:
   (a) providing a lens-shaped polymer having hydroxyl groups pendant therefrom from a homogeneous monomer solution comprising therein one or more polymerizable monomers including at least one polymerizable hydroxyl-substituted monomer, wherein said solution contains dispersed therein a UV-absorbing agent substituted with at least one anhydride group, under conditions effective to polymerize said one or more polymerizable monomers without causing said UV-absorbing agent to react; and
   (b) exposing said polymer to basic conditions effective to cause said hydroxyl groups to react with anhydride groups on said UV-absorbing agent, whereby said UV-absorbing agent becomes covalently bound with said polymer.

2. A process according to claim 1 wherein said UV-absorbing agent is 3,3',4,4'-benzophenonetetracarboxylic dianhydride.

3. A process according to claim 1 wherein said UV-absorbing agent is an anhydride derivative of 4,4'-dioctyloxyoxanilide, 2,4,6-tris(2-hydroxy-4-octyloxyphenyl)-1,3,5-triazine, 4-tert-butylphenylsalicylate, dibenzoyl resorcinol, or 3'-sec-butyl-5'-tert-butyl-2-(2'-hydroxyphenyl)benzotriazole.

4. A process according to claim 1 wherein said monomer solution comprises one or more hydroxyalkyl esters of acrylic or methacrylic acid.

5. A process according to claim 1 wherein said monomer solution comprises hydroxyethylmethacrylate.

6. A process according to claim 1 wherein said monomer solution comprises one or more compounds selected from the group consisting of hydroxyethylacrylate, 2,3-dihydroxypropyl methacrylate, hydroxypropylmethacrylate and hydroxypropylacrylate.

7. A process according to claim 1 wherein said monomer solution comprises hydroxyethylmethacrylate and methacrylic acid.

8. A process according to claim 1 wherein said monomer solution comprises hydroxyethylmethacrylate, methacrylic acid and ethylene glycol dimethacrylate.

9. A process according to claim 1 wherein said monomer solution comprises hydroxyethylmethacrylate, methacrylic acid, ethylene glycol dimethacrylate and trimethylolpropane trimethacrylate.

10. A process according to claim 1 wherein said monomer solution comprises α-hydroxy-α, α-dimethylacetophenone.

11. A process according to claim 1 wherein said monomer solution includes a water displaceable inert diluent.

12. A process according to claim 1 wherein said monomer solution includes boric acid ester.

13. A process according to claim 1 wherein said monomer solution comprises one or more compounds selected from the group consisting of acrylate and methacrylate diesters of polyethylene glycol wherein the molecular weight of the polyethylene glycol is 100 to 8,000, acrylate and methacrylate diesters of bisphenol A diols ethoxylated at one or each of the diol ends with 1–20 ethoxy units, $C_1$–$C_6$ aliphatic alcohol acrylates and methacrylates, perfluoro $C_1$–$C_6$ alcohol methacrylates and perfluoro $C_1$–$C_6$ alcohol acrylates.

14. A process according to claim 1 wherein said monomer solution comprises one or more compounds selected from the group consisting of PEG 4500, bisphenol A diols ethoxylated with a total of 10 moles of ethylene oxide, PEG 350 monomethylether, and dodecanol, which compounds have been end-capped with isocyanatoethyl methacrylate, methacrylic anhydride or methacrylyl chloride.

* * * * *